United States Patent [19]
Durco, Jr.

[11] Patent Number: 5,644,630
[45] Date of Patent: Jul. 1, 1997

[54] INTERCOM SYSTEM FOR A SERVICE ESTABLISHMENT

[76] Inventor: Andrew Durco, Jr., Five North McCormick St., Oklahoma City, Okla. 73127-6620

[21] Appl. No.: 598,091

[22] Filed: Feb. 7, 1996

Related U.S. Application Data

[63] Continuation of Ser. No. 489,826, Jun. 13, 1995, abandoned, which is a continuation of Ser. No. 212,906, Mar. 15, 1994, abandoned.

[51] Int. Cl.$^6$ .............................. H04M 1/00; H04M 1/60
[52] U.S. Cl. ..................... 379/159; 379/160; 379/167
[58] Field of Search ..................... 379/156, 157, 379/159, 160, 165, 167, 170, 171, 172, 173, 265, 266

[56] References Cited

U.S. PATENT DOCUMENTS

| | | | |
|---|---|---|---|
| 4,398,257 | 8/1983 | Paganini et al. | 364/550 |
| 4,415,065 | 11/1983 | Sandstedt . | |
| 4,510,351 | 4/1985 | Costello et al. . | |
| 4,638,312 | 1/1987 | Quinn et al. . | |
| 4,675,647 | 6/1987 | Salin et al. . | |
| 4,797,818 | 1/1989 | Cotter . | |
| 4,803,348 | 2/1989 | Lohrey et al. . | |
| 4,893,334 | 1/1990 | Parnello | 379/159 |
| 4,959,686 | 9/1990 | Spallone et al. . | |
| 4,989,234 | 1/1991 | Schakowsky | 379/113 |
| 4,996,709 | 2/1991 | Heep | 379/160 |
| 5,006,983 | 4/1991 | Wayne et al. . | |
| 5,013,897 | 5/1991 | Harman et al. . | |
| 5,020,095 | 5/1991 | Morganstein | 379/266 |
| 5,027,347 | 6/1991 | Malkki | 379/159 |
| 5,053,868 | 10/1991 | Higgins et al. | 358/93 |
| 5,125,026 | 6/1992 | Holcombe | 379/171 |
| 5,144,653 | 9/1992 | Masuoka | 379/266 |
| 5,166,972 | 11/1992 | Smith . | |
| 5,185,780 | 2/1993 | Leggett | 379/113 |
| 5,309,504 | 5/1994 | Morganstein | 379/265 |
| 5,315,639 | 5/1994 | Lassers | 379/167 |
| 5,327,490 | 7/1994 | Cave | 379/266 |

OTHER PUBLICATIONS

"5ESS Switch ACD/MIS by AT&T" Aug. 1990; pp. 1–106; 379/265.

*Primary Examiner*—Curtis Kuntz
*Assistant Examiner*—Vijay Shankar
*Attorney, Agent, or Firm*—Marc A. Hubbard; Winstead Sechrest & Minick P.C.

[57] ABSTRACT

An intercom system (110) for a drive-in restaurant (102) is integrated with a point of sale system (118) through a computer (126) that provides for tracking and managing intercom calls to operators taking orders. The computer indicates to point of sale system when a call from an intercom extension is received, and the point of sale system indicates on a terminal (116) for the point of sale system that a call is waiting. In addition to providing an interface between the intercom system and point of sale system, the computer queues unanswered calls and tracks calls after they have been answered. The computer also maintains timing of calls to assist in management of the restaurant.

15 Claims, 1 Drawing Sheet

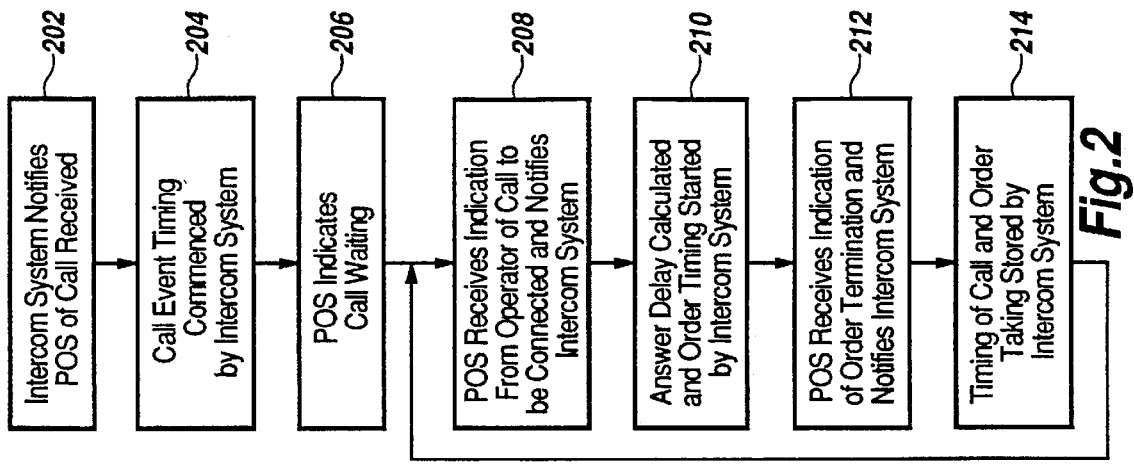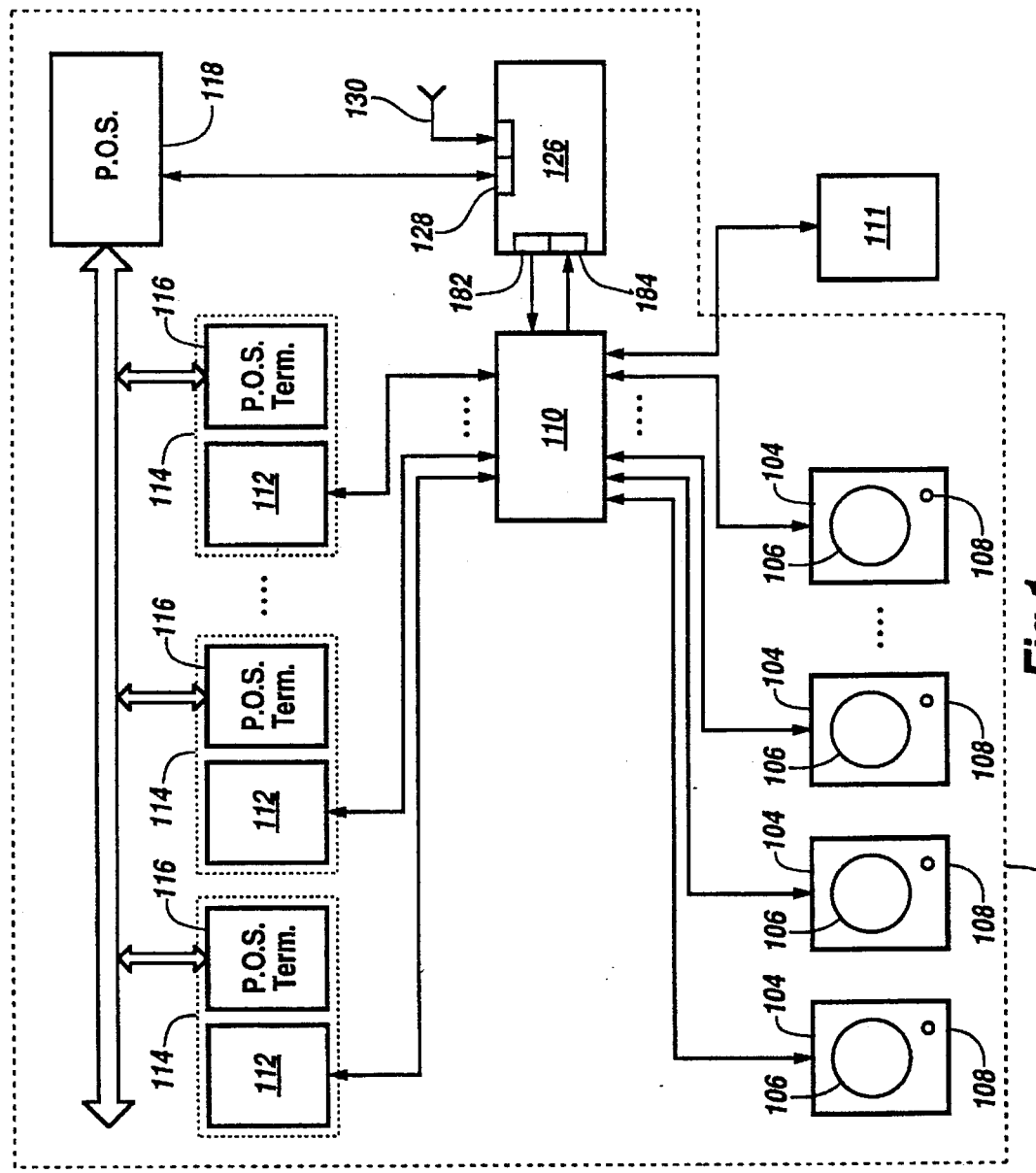

INTERCOM SYSTEM FOR A SERVICE ESTABLISHMENT

This Application is a continuation of application Ser. No. 08/489,826, filed on Jun. 13, 1995, now abandoned, which is a continuation of application Ser. No. 08/212,906, filed on Mar. 15, 1994, now abandoned.

FIELD OF THE INVENTION

The invention relates to intercom systems, especially for drive-in service establishments.

BACKGROUND OF THE INVENTION

A point of sale system generally tracks sales of goods and services at a retail establishment. A point of sale systems can be a simple cash register. However, many retail establishments utilize computer systems with multiple terminals to track a wide range of data on each transaction, including, for example, the name of the customer, the cashier, the goods and services sold, time and date of the transaction, gratuities and taxes. These systems may be integrated with inventory tracking systems and, in restaurants for example, order taking systems that deliver food orders to a kitchen for preparation.

Restaurants basically sell the services of food preparation and delivery. Most restaurants rely on persons to take food orders, whether it is at a walk-up counter or by a wait person at a table. However, in a certain restaurants, food orders may be taken over an intercom system. An intercom system generally has several extensions connected through a single switching apparatus. The majority of restaurants using an intercom simply have a drive-through window where customers order and pick-up food to take off-premises to eat. The intercom systems in these "fast-food" restaurants generally employ a single remote extension next to a drive-in lane operated by a person taking the order.

Drive-in restaurants often rely on intercom systems to take food orders, as do some novelty restaurants that place an intercom extension on each table or booth in a dining room. In drive-in restaurants, customers drive into a parking stall and eat in their vehicles on the premises. A menu and speaker is placed next to the drive-in stall. The customer orders food by pushing a call button next to the menu, which calls an order taking station via an intercom system. Someone then delivers the food to the car on a tray.

Like all retail service establishments, quality of services in a drive-in restaurant is paramount to customer satisfaction. However, patrons are remotely located on premises and can communicate with staff only through an intercom, making it more difficult to ensure that they are receiving an adequate level of services. Because the intercom is the primary mode of communication, establishing timely communication is critical to providing good quality service.

SUMMARY OF THE INVENTION

The invention relates to a specially adapted intercom system for taking orders or service requests and for controlling and managing taking of orders. The invention helps to ensure that calls on the intercom system are timely answered and processed.

According to the invention, an intercom system on the premises of service establishment includes an intercom extension at each of a plurality of order placing or service requesting locations and at each of one or more order taking positions. Coupled to the intercom system is a data processing system. When a call is made, the intercom system signals the data processing system with the identity of the location calling. The data processing system then tracks timing parameters for the call related to responsiveness of the establishment in taking the order and queues intercom calls according to predetermined criteria to enable an order taker to respond to calls in a consistent manner and according to priorities desired by the establishment. The invention enables real-time and subsequent review of responsiveness and dynamic altering of queuing criteria.

According to other aspects of the invention, the intercom system is adapted for integration with a point of sale system or order taking system to further enhance the ability to take orders in a timely fashion and assist in ensuring prompt delivery of an order to the location placing the order. The data processing system provides data to a point of sale system or other service ordering system. The system indicates to an operator that a call is waiting or a displays a call queue. An operator taking the order indicates through the service ordering system to connect next call in queue to an intercom station at the order taking position and the data processing system. The service ordering system then provides to the data processing system timing information relating to taking of the order. If an order placing location calls before delivery of an order, a terminal in the service ordering system indicates that a call may be an add-on order, permitting that call to be taken before others in queue.

These and other aspects and advantages of the invention will be apparent from the following description of a preferred embodiment of the invention illustrated in the accompanying drawings.

BRIEF DESCRIPTION OF THE DRAWINGS

FIG. 1 is a schematic representation of a integrated intercom and point of sale system for a drive-in restaurant.

FIG. 2 is a flow diagram of basic process steps carried out by the intercom and point of sale system.

DETAILED DESCRIPTION OF THE PREFERRED EMBODIMENT

In the following description, like reference numbers refer to like parts.

Referring to FIG. 1, dashed line 102 indicates the premises of a drive-in restaurant or other establishment where patrons are served through use of an intercom system. The drive in restaurant includes a plurality of stalls. Each stall is fitted with a menu (not shown), usually with large lettering and mounted for easy reading by patrons sitting in an vehicle. Also fitted in each stall, near the menu, is an intercom extension 104. Each intercom extension includes a speaker 106 and a call button 108 for signalling switchboard 110. Intercom extensions may also be placed next to a drive-through lanes and a walk up counters. An outside telephone line from a public network, represented by box 111, may also be connected to the intercom system to take phone-in orders.

Each remote intercom extension is connected to intercom system 110. The intercom system operates in a half-duplex mode and is comprised of several line cards and a voice switch for interconnecting any one of the intercom extension 104 to any one of second set of intercom extensions 112. However, if desired, the intercom system may be full duplex, but a full duplex system tends to be more expensive. Each of the extensions in the second set is a handset unit. Each order taking position, indicated by dashed lines 114, includes an intercom extension 112 and a terminal 116 of a point of sale system. Orders are taken over the intercom system by an operator standing at an order taking position.

An operator enters orders in a point of sale terminal. Point of sale systems ("POS") are widely known. Each terminal in the point of sale system is interconnected via bus 120 to a central computer 118. In addition to information related to the order transaction, computer 118 tracks food orders.

Intercom system 110 is connected to computer 126. The intercom system and the computer 126 may be located in the same enclosures. Computer 126 runs software that manages and tracks intercom calls placing orders. Computer 126 includes a terminal on which information on calls in queue, calls answered and elapsed times for the calls can be displayed, along with other historic timing information to enable management to monitor and work flow. Signalling information is transmitted between the intercom system and the computer through communications ports 122 and 124 on the computer. This signalling information includes identification of an intercom extension and commands for connection and disconnection of calls.

Computer 126 also communicates with computer 118 of the point of sale system, sending and receiving data relating to calls through serial, asynchronous communications port 128. Preferably, all data transmitted between the computer 126 and 118 is encoded in an ASCII formatted record and delimited by ASCII command characters. Use of ASCII formatted data transmission facilitates integration of the intercom system with a point of sale system based on an "IBM Standard" personal computer. Because of the use of asynchronous communication, records sent between the POS and the computer 126 include an error checking byte, a check-sum for example, and receipt of a transmission is acknowledged. Communications port 130 on computer 126 is used for diagnostic services, system maintenance for the computer 126 and intercom system, and remote monitoring of the establishment.

Referring now to FIGS. 1 and 2, basic steps of the process of computer 126, carried out under direction of a software program, and POS 118, also carried out by a software program, in tracking and managing the calls are illustrated by the flow diagram of FIG. 2. In the flow diagram, "intercom systems" refers to the combination of intercom system 110 and computer 126.

Beginning with step 202, a call is received from one of intercom extensions 104 located in one of drive-in stalls, drive-through lanes, walk-up counters or order placing location, or through phone line 111. The intercom system 110 provides an identifier for the call to the computer 126. Computer 126 prepare a call initiation record that includes an identifier for the type of call it is, e.g. from a stall, walk-up counter or phone, and a stall or other origin identifying number. The computer queues the calls according to a criteria desired by the establishment, such as the type or the location of the call, or according to the time in which they are received.

At step 204, timing of the call is begun and the call initiation record is transmitted to the POS system 118. At step 206, the POS indicates by a visual or audio alarm to each order taking position that a call is waiting. The POS may also display on a terminal 112 the queue of calls. The POS may also check to see if a call is from an order placing location such as a drive-in stall for which an order has been taken but not delivered, indicating that the call could be an add-on or revised order. If it is an add-on order, the POS will indicate to an operator on the terminal so that the call may be taken immediately, before the order is delivered.

At step 208, an operator indicates to the POS to accept a call. The POS sends to computer 126 a data packet identifying the call to be connected and the order taking extensions to which it is to be connected. At step 210, computer 126 signals the intercom system 110 to connect the indicated extensions. Computer 126 then generates an answer record and transmits this record to the POS. The call connected is the next call in queue, unless an operator indicates a specific call in the queue. Furthermore, once a call is answered, an operator can place the call on hold to accept another call by indicating to the POS to put the call on hold. This call could be a call on a phone line or an add-on order call. If a call is placed on hold the POS sends to the computer 126 a command to put the call on hold. The computer 126 then generates a hold record, indicating the extension on hold and the order taking position, and sends it to the POS to enable the POS to remind the operator of the call placed on hold.

At step 212, the operator indicates to the POS that an order is finished. The POS sends an packet to the computer 126 indicating which call to disconnect. Computer 126 signals the intercom system to disconnect the call and to connect the next call in sequence. At step 214, the computer calculates the order taking time for the call and creates a standard call record in which information about each call is stored for subsequent reporting and review by management. This information includes the time of call, identity of the operator and the order taking location type and number, the waiting time between call and answer, and the time it took to take the order. Each standard call record is stored on a database file on computer 126, enabling analysis of past responsiveness and comparison of past performance to current performance.

The intercom system 110 and the computer 126 are easily adapted for integration into other service establishments utilizing intercoms to communicate service requests. For example, a hospital may use the intercom and data processing system to monitor patient requests and integrate the intercom system with system for tracking services provided to the patient.

The forgoing description is of a preferred embodiment of the invention. Numerous modifications, rearrangements, substitutions, omission and modifications may be made to this embodiment without departing from the scope of the invention as set forth in the appended claims.

What is claimed is:

1. An intercom system for a service establishment comprising:

an intercom communications system having a plurality of intercom extensions for placement within a service establishment, the intercom system including,
        an intercom switch for selectively coupling intercom extensions for communication,
        a plurality of customer intercom extensions connected to the intercom switch for placement in proximity to a plurality of customer ordering stations within the service establishment, each customer extension including means for signalling a request for service, and
        a service intercom extension connected to the intercom switch for placement in proximity to an order taking station enabled for signalling the intercom switch to connect a specific customer extension;
    means for tracking requests for service from the plurality of customer extensions, the means for tracking requests coupled to the intercom switch for receiving signalling information on calls from the plurality of second extensions the means for tracking including means for queuing calls placed by the plurality of second extensions; and means for providing information on next queued request for service to the order taking station.

2. The intercom system of claim 1 wherein the means for tracking further includes means for timing duration of time before a request placed by one the plurality of customer extensions is answered and means for timing duration of calls connected between the attendant extension and the one of the plurality of customer extensions.

3. The intercom system of claim 1 wherein the means for tracking is adapted for communicating to a service system data for identifying requests for service calls in queue; and the means for tracking being further adapted to receive from an order taking system an indication for connecting one of the plurality of second extensions to the first extension and in response thereto to signal the intercom switch to connect the indicated second extension to the first extension.

4. The intercom system of claim 1 coupled to a point of sale system, wherein the means for tracking is adapted for forming and communicating data identifying the calls in queue to the point of sale system and the point of sale system is adapted to indicate to an operator that a call is waiting and to receive an indication from an operator to connect a selected call;

the point of sale system is adapted to communicate commands to the means for tracking to connect the selected call; and the means for tracking is further adapted to receive from the point of sale system the commands for connecting the selected call from one of the plurality of customer extensions to the service extension and in response thereto to signal the intercom switch to connect the call from the customer extension to the service extension.

5. The intercom system of claim 1 further including a plurality of service extensions, the intercom switch being adapted to selectively couple any one the plurality of service extensions to any one of the plurality of customer extensions.

6. An intercom system for a service establishment comprising:

an intercom communications system having a plurality of intercom extensions for placement within a service establishment, the intercom system including, an intercom switch for selectively coupling intercom extensions for communication, a plurality of customer intercom extensions connected to the intercom switch for placement in proximity to a plurality of customer ordering stations within the service establishment, each customer extension including means for signalling a request for service, and a service intercom extension connected to the intercom switch for placement in proximity to an order taking station enabled for signalling the intercom switch to connect a specific customer extension;

means for communicating, in response to signals received from the intercom switch, data for identifying to an order taking system requests for service calls being made by the plurality of customer extensions; and means for receiving data from the order taking system for connecting a selected service request call from one of the plurality of second extensions and in response thereto signalling the intercom switch to connect the selected call.

7. The intercom system of claim 6 wherein the order taking system is a point of sale system.

8. The intercom system of claim 6 wherein the order taking system includes means for receiving the identity of a call from the means for communicating and indicating to an operator that a service request call is waiting.

9. The intercom system of claims 8 wherein the order taking system further includes means for communicating data to the means for receiving to connect a service request call in response to an operator indicating to the order taking system to connect a service request call.

10. The intercom system of claim 9 further including means for determining, in response to data to connect a call received from the order taking system, an elapsed time between a time at which the call is placed by one of the plurality of customer extensions and a time a call is connected to the service extension.

11. The intercom system of claim 6 further including means for queuing service request calls from the plurality of customer extensions, wherein data transmitted by the means for communicating includes queuing information.

12. The system of claim 6 further including means for signalling the intercom switch to disconnect a call between one of the plurality of customer extensions and the service extension in response to receipt of data from the order taking system to disconnect the call.

13. The system of claim 12 further including means for determining duration of a connected call in response to receiving from a order taking system data to disconnect a call.

14. A system for improving taking service orders over an intercom system at a service establishment comprising:

an intercom system including, at least one first intercom extension for placement in proximity to a service system of a service establishment, the at least one first extension adapted for receiving calls placing a service order to be entered into the service system;

a plurality of second intercom extensions each adapted for calling the first extensions to place an order, each of the second extensions including patron-operable means for signalling for service; and an intercom switch for selectively connecting one of the first extensions to one of the plurality of second extensions;

a computer coupled to the intercom switch for communication; and a service order taking system coupled to the computer for communication;

wherein the computer includes means for receiving from the intercom switch data indicating a call being placed by one of the plurality of second extensions, means for queuing calls, means for communicating data on calls waiting to the service order taking system, and means for determining time for calls placed by one of the plurality of second extensions to be answered by the first extension; and wherein the service order taking system includes means for receiving the data on calls waiting and displaying the data to a service provider.

15. The system of claim 14 further wherein the service order taking system further includes means for signalling the computer to connect the next call in queue and the computer further includes means for signalling the intercom switch to connect the one of the plurality of second extensions having the next call in queue to the first extension.

* * * * *